US011824747B2

(12) United States Patent
Dillon

(10) Patent No.: US 11,824,747 B2
(45) Date of Patent: Nov. 21, 2023

(54) ENHANCED NETWORK COMMUNICATION USING MULTIPLE NETWORK CONNECTIONS

(71) Applicant: Hughes Network Systems, LLC, Germantown, MD (US)

(72) Inventor: Douglas Dillon, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 17/837,553

(22) Filed: Jun. 10, 2022

(65) Prior Publication Data

US 2022/0303203 A1 Sep. 22, 2022

Related U.S. Application Data

(63) Continuation of application No. 16/900,063, filed on Jun. 12, 2020, now Pat. No. 11,362,920.
(Continued)

(51) Int. Cl.
*H04L 12/26* (2006.01)
*H04L 43/0852* (2022.01)
(Continued)

(52) U.S. Cl.
CPC ...... *H04L 43/0852* (2013.01); *H04L 12/4633* (2013.01); *H04L 45/121* (2013.01);
(Continued)

(58) Field of Classification Search
None
See application file for complete search history.

(56) References Cited

U.S. PATENT DOCUMENTS 6,590,867 B1 * 7/2003 Ash .................. H04L 45/02
709/240
7,336,967 B2 2/2008 Kelly et al.
(Continued)

FOREIGN PATENT DOCUMENTS

EP 1052812 11/2000
EP 2760163 7/2014
(Continued)

OTHER PUBLICATIONS

EP Office Action in European Appln. No. 20179725.5, dated Sep. 19, 2022, 8 pages.
(Continued)

*Primary Examiner* — Eunsook Choi
(74) *Attorney, Agent, or Firm* — Fish & Richardson P.C.

(57) ABSTRACT

Systems, methods, and apparatus, including computer-readable media, for enhanced network communication using multiple network connections. In some implementations, a networking apparatus concurrently maintains connectivity to a network through each of multiple network transports. The networking apparatus receives one or more packets to be transmitted over the network and classifies the one or more packets to determine a class of service. The networking apparatus selects one of the multiple network transports to transmit the one or more packets based on (i) the class of service for the one or more packets and (ii) measures of expected latency for transmission of the one or more packets over the respective multiple network transports. The networking apparatus transmits the one or more packets using the selected network transport.

20 Claims, 7 Drawing Sheets

Related U.S. Application Data

(60) Provisional application No. 62/861,258, filed on Jun. 13, 2019.

(51) Int. Cl.
  *H04L 12/46* (2006.01)
  *H04L 45/121* (2022.01)
  *H04L 45/302* (2022.01)
  *H04L 45/00* (2022.01)
  *H04L 47/2441* (2022.01)

(52) U.S. Cl.
  CPC ............ *H04L 45/302* (2013.01); *H04L 45/54* (2013.01); *H04L 47/2441* (2013.01)

(56) References Cited

U.S. PATENT DOCUMENTS

| | | | |
|---|---|---|---|
| 7,389,533 B2* | 6/2008 | Bartlett | H04L 47/12 |
| | | | 713/153 |
| 7,426,181 B1* | 9/2008 | Feroz | H04L 47/10 |
| | | | 370/231 |
| 7,643,416 B2 | 1/2010 | Pardee et al. | |
| 7,774,501 B2 | 8/2010 | Dillon | |
| 9,716,659 B2 | 7/2017 | Dillon | |
| 10,587,431 B2* | 3/2020 | Zhang | H04L 45/22 |
| 10,819,420 B2* | 10/2020 | Roy | H04W 28/082 |
| 11,381,511 B2 | 7/2022 | Chin et al. | |
| 2003/0219022 A1 | 11/2003 | Dillon et al. | |
| 2010/0020681 A1* | 1/2010 | Nakashima | H04L 47/10 |
| | | | 370/437 |
| 2013/0142038 A1* | 6/2013 | Pan | H04L 47/25 |
| | | | 370/230 |
| 2013/0315062 A1* | 11/2013 | Riedl | H04L 47/50 |
| | | | 370/230 |
| 2014/0133294 A1 | 5/2014 | Horn et al. | |
| 2014/0198662 A1* | 7/2014 | Shimizu | H04L 45/122 |
| | | | 370/238 |
| 2014/0321277 A1* | 10/2014 | Lynn, Jr. | H04L 43/0811 |
| | | | 370/235 |
| 2014/0370835 A1* | 12/2014 | Wu | H04W 4/90 |
| | | | 455/404.1 |
| 2015/0195778 A1 | 7/2015 | Parsons | |
| 2017/0251328 A1* | 8/2017 | Klein | H04W 4/06 |
| 2018/0131620 A1* | 5/2018 | Su | H04L 47/2441 |
| 2018/0176816 A1* | 6/2018 | Meylan | H04L 47/2433 |
| 2018/0254984 A1* | 9/2018 | Floyd, III | H04L 45/243 |
| 2019/0158371 A1 | 5/2019 | Dillon et al. | |

FOREIGN PATENT DOCUMENTS

| | | |
|---|---|---|
| EP | 3414932 | 12/2018 |
| WO | WO2014026050 | 2/2014 |
| WO | WO 2015038380 | 3/2015 |
| WO | WO 2017139699 | 8/2017 |
| WO | WO2017139699 | 8/2017 |
| WO | WO2022147175 | 7/2022 |

OTHER PUBLICATIONS

Extended European Search Report in European Appln. No. 20179725.5, dated Oct. 30, 2020, 9 pages.

* cited by examiner

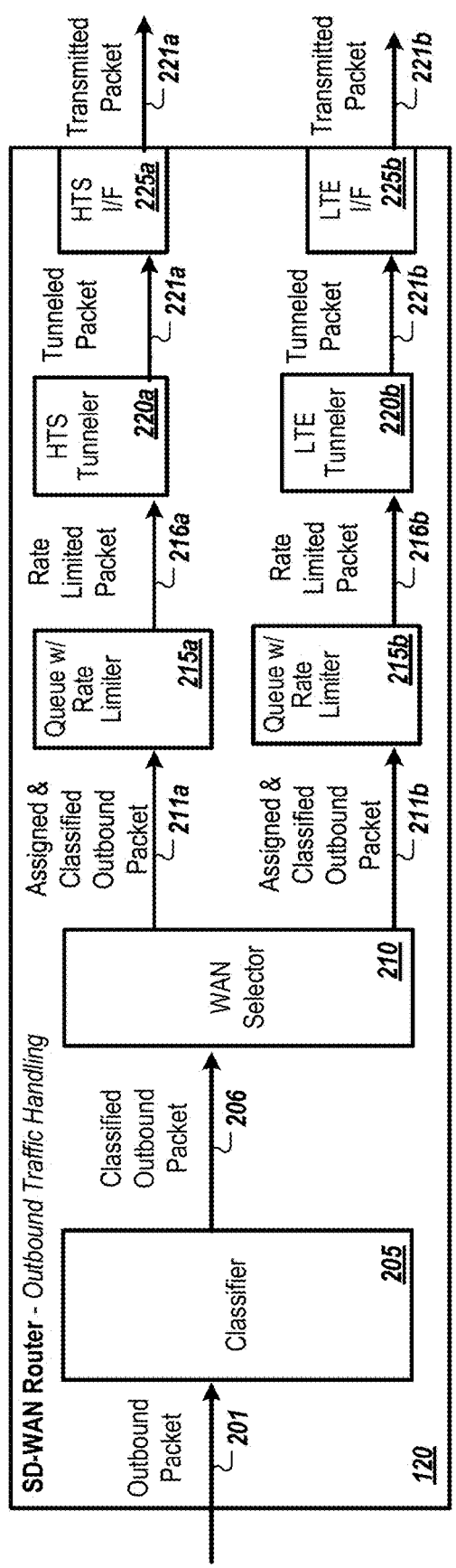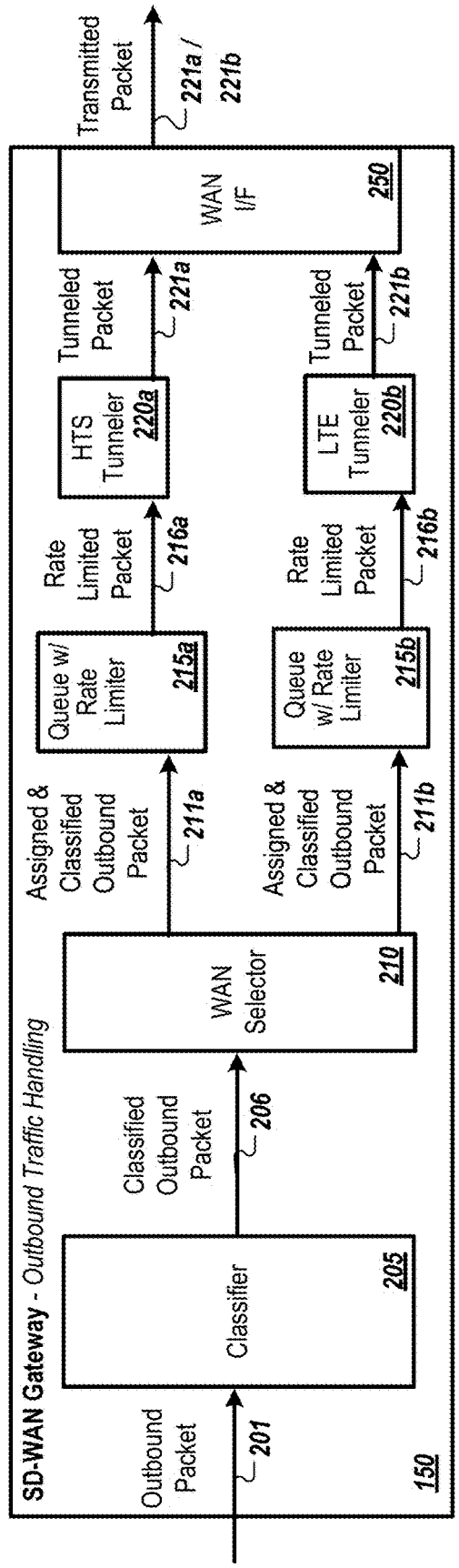
FIG. 2

| | 402 | 404 | 406 | 408 | 410 | 412 | 414 | 416 | 418 |
|---|---|---|---|---|---|---|---|---|---|
| | Sel WAN | LTE Expected Latency Ms | HTS Expected Latency Ms | LTE Target Bit Rate MBits/Sec | LTE Baseline Latency Ms | LTE Queue Depth Bytes | HTS Target Bit Rate MBits/Sec | HTS Baseline Latency Ms | HTS Queue Depth Bytes |
| 401a | LTE | 60 | 350 | 0.5 | 60 | 0 | 20 | 350 | 0 |
| 401b | HTS | 380 | 350 | 0.5 | 60 | 20,000 | 20 | 350 | 0 |
| 401c | HTS | 3260 | 430 | 0.5 | 60 | 200,000 | 20 | 350 | 200,000 |
| 401d | HTS | 860 | 550 | 0.5 | 60 | 50,000 | 20 | 350 | 500,000 |
| 401e | LTE | 60 | 350 | 5 | 60 | 0 | 20 | 350 | 0 |
| 401f | LTE | 92 | 350 | 5 | 60 | 20,000 | 20 | 350 | 0 |
| 401g | LTE | 380 | 430 | 5 | 60 | 200,000 | 20 | 350 | 200,000 |
| 401h | HTS | 1660 | 750 | 5 | 60 | 1,000,000 | 20 | 350 | 1,000,000 |

Annotations:
- LTE is faster when lightly loaded (→ 401a)
- Reasonably fast HTS will speed up slow LTE substantially (→ 401b)
- HTS cuts seconds off web page response w/slow LTE (→ 401c, 401d)
- HTS will speed up LTE (or even DSL) for big web pages (→ 401h)

FIG. 4

| Web Page | Page Size MB | Response Time Sec | LTE-Only Resp Time Sec | LTE Mbit/sec | HTS Effective Mbit/sec | HTS Effective Mbit/sec | HTS Utilization | HTS Mbit/sec |
|---|---|---|---|---|---|---|---|---|
| Page 1 | 10 | 2.4 | 20 | 4 | 30 | 100% | 30 |
| Page 1 | 10 | 4.2 | 20 | 4 | 15 | 50% | 30 |
| Page 1 | 10 | 7.0 | 20 | 4 | 7.5 | 25% | 30 |
| Page 1 | 10 | 11.4 | 20 | 4 | 3 | 10% | 30 |

*501a* → (row 1), *501b* → (row 2), *501c* → (row 3), *501d* → (row 4)

ENHANCED NETWORK COMMUNICATION USING MULTIPLE NETWORK CONNECTIONS

CROSS-REFERENCE TO RELATED APPLICATION

This application is a continuation of U.S. application Ser. No. 16/900,063, filed Jun. 12, 2020, which claims the benefit of U.S. Provisional Patent Application No. 62/861,258, filed on Jun. 13, 2019. The entire contents of each of the prior applications are incorporated by reference herein.

BACKGROUND

Different types of network connections can have significantly different properties. For example, different access technologies, e.g., cellular, satellite, digital subscriber line (DSL), coaxial cable, fiber-optics, etc., all provide different performance characteristics, and in some cases the performance characteristics vary over time. The latency, throughput, and other performance characteristics that are needed for different types of transfers can also vary depending on the situation or application in which the data is used (e.g., streaming media, file transfer, web browsing, etc.).

SUMMARY

In some implementations, networking devices can manage traffic over multiple WAN transports, e.g., different physical network interfaces or physical connections, to provide high performance in a variety of different situations. Multiple network transports can be used concurrently, with the devices selecting the network transport to be used for each packet or group of packets according to the requirements of the application. For example, a device can include a classifier that classifies packets as interactive traffic (e.g., web pages) or bulk traffic (e.g., streaming media, file downloads, etc.). The device can then select the best available network transport for each type of traffic and use the selected transport to make the transmission.

As an example, a router may have access to a first network transport and a second network transport, with both being available concurrently and both providing different performance characteristics. The first network transport may provide low latency, but may have other limitations, such as lower throughput, data usage caps, etc. The second network transport may provide higher latency, but provide other advantages, such as higher throughput, less-restrictive data usage caps or no caps, etc. The router can use a classifier to assign packets to be transmitted to different classes, e.g., different classes of service, and then use the class assignments and expected latencies for transmission to select which network transport to use to transmit the packets. For example, the router can select to send packets that are not sensitive to latency (e.g., bulk transfers) over the network transport having the lowest data usage cap, lowest cost, highest throughput, etc. For packets that are very latency-sensitive, the router can select to send packets over the lowest-latency connection.

In some implementations, the router can determine the estimated latencies for transmission over the different network transports, and can select the network transport that currently provides the lowest expected latency. This can be done generally or for packets in certain classes, such as classes representing an intermediate level of sensitivity to latency. The expected latency of a transport can be computed to reflect not only the latency of the physical communication channel, e.g., time from transmission to receipt, but the overall latency from the time the packet enters a transmission queue until the time it is received at the receiver. In other words, the overall latency may include the time that a newly added packet would need to wait in the transmission queue while packets already in the transmission queue are transmitted and cleared. Thus, even if a first network transport offers the lowest baseline latency (e.g., average, typical, or minimum latency) of the available network transports due to its physical properties (e.g., latency of the physical channel), if the first transport has a heavily loaded queue, the router may determine that a second transport would provide lower effective latency and may select the second transport to make the transmission.

The multiple network transports can be available concurrently and the system can concurrently use both transports. This can include splitting a single IP flow across the multiple transports, which can often provide overall latency, throughput, and other performance results that are better than would be achieved with any individual network transport available. The devices can establish a packet tunnel for each different network transport, and tunneled packets can include resequencing information, such as an IP flow identifier and a sequence number indicating a position of the packet in the sequence. At the receiving side, the packets received through both tunnels can be un-tunneled and the various IP flows can be reconstructed based on the re-sequencing information.

The selection of a network transport can be done at a fine-grained level, e.g., for each packet or group of packets. The selection of a network transport for a packet can also can account for dynamically changing conditions. Rather than simply assume that the baseline or ideal conditions are present for the different network transports, the device can use observed and actual conditions for the network transports to estimate the latency that would be experienced at that time and for a specific packet being processed. For example, the latency and throughput available on a network transport (such as coaxial cable or cellular) may vary based on the level of traffic from of other users. Similarly, the amount of data already queued for transmission over the different network transports can affect how quickly a newly added packet would be transmitted. To account for these changing factors that will affect actual latency experienced, the device can periodically generate new estimated latency calculations or update tables from which estimates are derived, e.g., every 50 ms, after processing a certain number of packets to be transmitted or a certain amount of data to be transmitted, etc.

In general, a networking device can determine the expected latency for a new packet for each of the multiple transports, and then select the transport that provides the lowest expected latency. To select the appropriate network transport for a given packet or group of packets, a networking device can calculate or look up the expected latency for a packet given current conditions (e.g., a transport's latency, throughput, and current transmission queue depth). When calculating the expected latency for a packet, the amount of data already queued for transmission (e.g., current transmission queue depth) for each transport can be taken into account. Perhaps counterintuitively, the higher-latency transport can sometimes provide the lowest latency option for making a transmission. For example, a first network transport may have a low baseline latency, e.g., 60 ms, but also a low bandwidth under current conditions (e.g., congestion, interference, etc.). If there is significant data in the transmission queue already, the expected latency for a packet being then added to the queue may be much higher than the baseline latency. In other words, the expected latency for the new packet would include the baseline latency plus the delay to clear the queue of data already waiting to be transmitted. By contrast, a second transport with higher baseline latency may provide lower expected latency (and actual latency) if, for example, the second transport's queue depth is lower (e.g., so there is less data waiting to be transmitted) and/or the throughput is higher (e.g., data in the queue will be cleared faster). As a result, the network transport having the higher baseline latency can actually provide a lower estimated latency and actual latency for a packet, due to differences between the network transports for queue depth, bandwidth, or other factors.

This technology falls generally within the field of networking technology and deals with the subjects of: (1) Internet Access, including with applications to VPN provided private networking; (2) WAN Optimization, e.g., whereby existing Internet and VPN networking is optimized or improved to provide for Quality-Of-Service (QoS) Overlay which support with multiple classes of services across a Broadband connection which does not support QoS itself; (3) Satellite Communications, e.g., where geosynchronous satellites may provide ubiquitous connectivity but operate with an order of magnitude higher latency than terrestrial network connectivity and where TCP spoofing may be used to reduce the effect of latency on bulk transfer throughput; (4) Wireless Cell Phone-Oriented Networking, e.g., using technologies such as 4G, LTE and 5G to provide wireless connectivity to the Internet; (5) Software-Defined Wide Area Networking (SD-WAN), e.g., where multiple (typically two) broadband transports are combined to provide better service and availability than what is provided by either transport individually.

The techniques discussed herein are sometimes referred to as an Agile-Switching Active-Path (ASAP) feature can be used in acceleration appliances and other WAN optimization technologies. As discussed below, the system can adaptively switch between using satellite-based network access technology and other network access technology (e.g., cellular network access, wired network access, etc.), or provide different types of traffic on the different access technologies, to achieve, for example, improved throughput, lower latency, lower cost, and other benefits.

In one general aspect, a SD-WAN operates with a first WAN transport and a second WAN transport being concurrently available, the second WAN transport having a higher latency and lower usage cost than the first WAN transport. In some implementations, a classifier classifies bulk-transfer priority packets to be carried at low priority by the second WAN transport that has higher latency and lower usage cost than the first WAN transport. In some implementations, a classifier classifies interactive and intermediate priority packets to be carried at low priority by the first WAN transport having lower latency and higher usage cost than the second WAN transport. In some implementations, a classifier classifies Internet Protocol (IP) packets so that interactive application startup handshake packets are carried at high priority over the first WAN transport providing lower latency. In some implementations, a classifier classifies an IP packet as an interactive packet, and the interactive packet is carried by the WAN transport that is estimated to have the lower latency for that transport. In some implementations, the packets of an IP flow may be sent through SD-WAN tunnels for the respective WAN transports, and a receiver resequences an IP-flow's packets at the receiving end of the SD-WAN tunnels. In some implementations, the SD-WAN may provide a quality of service overlay. In some implementations, a usage limit for the first WAN transport is monitored and a progressively larger portion of the traffic is carried by the second WAN transport as the first WAN transport's usage limit is approached. In some implementations, the expected latency of a packet determined is based upon (i) the expected throughput of that packet's class of service and (i) the amount of queued data awaiting transmission for the packet's class of service; the expected latency is estimated for each of the WAN transports and the packet is assigned to be carried by the WAN transport with the lowest estimated latency. This can include splitting the packets of an IP flow across respective SD-WAN tunnels for the different WAN transports, packets of the IP-flow are resequenced at the receiving end of the SD-WAN tunnels.

In one general aspect, a method includes: operating, by the networking apparatus, such that the networking apparatus concurrently maintains connectivity to a network through each of multiple network transports; receiving, by the networking apparatus, one or more packets to be transmitted over the network; classifying, by the networking apparatus, the one or more packets to determine a class of service for the one or more packets from among a predetermined set of classes of service that includes classes of service that correspond to different latency constraints; selecting, by the networking apparatus, one of the multiple network transports to transmit the one or more packets based on (i) the class of service for the one or more packets and (ii) measures of expected latency for transmission of the one or more packets over the respective multiple network transports, wherein the measures of expected latency are based at least in part on amounts of data queued to be transmitted over the respective network transports; and transmitting, by the networking apparatus, the one or more packets using the selected network transport.

Implementations may include one or more of the features discussed below, in any combination or sub-combination.

In some implementations, selecting one of the multiple network transports includes: accessing a table indicating a network transport to select for each of the different classes of service, the network transports indicated in the table for at least one of the classes of service being determined based on the measures of expected latency of the different network transports for the at least one of the classes of service; and selecting the network transport that the table indicates for the class of service determined for the one or more packets.

In some implementations, the method includes periodically updating the table based on at least one of: an amount of data in a transmission queue for one of the network transports, a current throughput of one of the network transports, or a current transmission latency of one of the network transports.

In some implementations, the method includes updating the table in response to: determining that a predetermined interval of time has elapsed; determining that the network apparatus has received or processed a predetermined amount of data to transmit; or determining that the network apparatus has received or processed an amount of data to transmit that corresponds to at least a threshold amount of transmission time over one or more of the network transports.

In some implementations, the method includes calculating a first measure of expected latency for a first network transport of the multiple network transports, wherein the first measure of expected latency is based on a baseline latency for the first network transport, a throughput of the first network transport, and a transmission queue depth for a transmission queue for the first network transport, the measure of expected latency indicating an overall latency between adding a packet to the transmission queue and receipt of the packet over the first network transport. The method can include calculating a second measure of expected latency for a second network transport of the multiple network transports, wherein the second measure of expected latency is based on a baseline latency for the second network transport, a throughput of the second network transport, and a transmission queue depth for a transmission queue for the second network transport, the measure of expected latency indicating an overall latency between adding a packet to the transmission queue and receipt of the packet over the second network transport.

In some implementations, selecting one of the multiple network transports includes: comparing the first measure of expected latency with the second measure of expected latency; and based on the comparison, selecting the network transport having the lowest expected latency.

In some implementations, the method includes comparing the first measure of expected latency with the second measure of expected latency; and based on the comparison, updating a look-up table to indicate the network transport having the lowest expected latency as the network transport to select for a particular class of service.

In some implementations, the multiple network transports include a first network transport and a second network transport, where the first network transport provides lower baseline latency than the first network transport. The predetermined set of classes of service include a first class of service and a second class of service, where the first class of service corresponds to a class of service representing lower latency than a class of service corresponding to the second class of service. The network apparatus is configured to: select the first network transport to carry traffic assigned to the first class of service; and select the second network transport to carry traffic assigned to the second class of service.

In some implementations, the predetermined set of classes of service includes a third class of service representing higher latency than the first class of service and lower latency than the second class of service. For traffic assigned to the third class of service, the network apparatus is configured to select between the first network transport or the second transport depending on measures of expected latency for the first network transport and the second network transport, where the measures of expected latency are based on (i) respective transmission queue depths of the first network transport and the second network transport and (ii) respective throughputs of the first network transport and the second network transport.

In some implementations, the method includes communicating between the networking apparatus and a second networking apparatus over a network by (i) using a first network tunnel for communication over a first network transport, and (ii) using a second network tunnel for communication over the second network transport, where the first network tunnel and the second network tunnel are concurrently maintained.

In some implementations, the one or more packets are part of an IP flow, and the method includes: tagging the one or more packets with (i) an IP flow identifier and (ii) sequence numbers that respectively indicate a position of each of the one or more packets in a sequence of packets for the IP flow; and transmitting each of the one or more packets with the IP flow identifier and its sequence number.

In some implementations, transmitting the one or more packets using the selected network transport includes: tunneling each of the one or more packets using a network tunnel associated with the selected network transport.

In some implementations, the predetermined set of class of services include at least one of: classes of service corresponding to different content types; or classes of service corresponding to different priority levels.

In some implementations, the classes of include multiple levels of priority for each of multiple different types of network traffic.

In some implementations, the networking apparatus is a software-defined wide area network (SD-WAN) router or a SD-WAN gateway.

In some implementations, the multiple network transports include a first network transport that includes a satellite access network and a second network transport that does not include a satellite network.

In some implementations, the network transports include network transports of at least two different access network types from the group consisting of cellular, satellite, digital subscriber line (DSL), coaxial cable, and fiber-optics.

In some implementations, the one or more priority queues are used to provide a quality-of-service overlay.

In some implementations, the networking apparatus is a router, the endpoint is a gateway, and the router receives the packet to be transmitted from a device that received access to the network through the router.

In some implementations, the method includes distributing traffic for a single IP flow over the multiple network transports.

In some implementations, the method includes: receiving packets tunneled through each of multiple network tunnels, where each of the multiple network tunnels corresponds to a different one of the network transports; untunnelling the received packets; resequencing the untunneled packets to restore a sequence of the packets; and providing the resequenced packets to a network interface for transmission in the restored sequence.

In some implementations, the method includes allocating resequencing queues for each of multiple IP flows, and using the resequencing queues to resequence the untunneled packets, where one or more of the IP flows include packets that are tunneled through different network tunnels and are carried by different network transports that correspond to the network tunnels.

In some implementations, the first network transport has a usage limit; and the method includes monitoring usage of the first network transport and incrementally reducing a fraction of traffic carried over the first network transport as a measure of usage of the first network transport increases.

In some implementations, incrementally reducing a fraction of traffic carried over the first network transport includes: calculating an estimated latency for transmitting a packet over the first network transport in a manner that overestimates the expected latency by increasing amounts as a measure of usage of the first network transport increases.

In some implementations, a first network transport provides a lower baseline latency than a second network transport of the multiple network transports. The first network transport is assigned to carry traffic assigned to a first set of priority level classifications, the first network transport is assigned to carry traffic assigned to a second set of priority level classifications, and where the priority level classifications in the first set have higher priority than priority level classifications in the second set. Incrementally reducing a fraction of traffic carried over the first network transport includes: reducing an amount of data carried by an IP flow for the first network transport; and after reducing the amount of data carried by the IP flow for the first network transport, altering the second set of priority level classifications such that the second network transport is assigned to carry traffic for one or more of the priority level classifications in the first set of priority level classifications.

In some implementations, the method includes determining that a particular received packet is a startup handshake packet for a connection, and in response to the determination, assigning the particular received packet to a highest-priority class of service of the predetermined set of classes of service.

In some implementations, the network apparatus operates with a first WAN transport and a second WAN transport being concurrently available, the second WAN transport having a higher latency and lower usage cost than the first WAN transport, where the network apparatus includes a classifier, where the method includes at least one of: (1) classifying, using the classifier, bulk-transfer priority packets to be carried at low priority by the second WAN transport that has higher latency and lower usage cost than the first WAN transport; (2) classifying, using the classifier, interactive and intermediate priority packets to be carried at low priority by the first WAN transport having lower latency and higher usage cost than the second WAN transport; (3) classifying, using the classifier, Internet Protocol (IP) packets so that interactive application or connection startup handshake packets are carried at high priority over the first WAN transport providing lower latency than the second WAN transport; or (4) classifying, using the classifier, an IP packet as an interactive packet, and the interactive packet is carried by the WAN transport that is estimated to have the lower latency for that transport.

In some implementations, the packets of an IP flow may be sent through network tunnels for the respective network transports, and the network apparatus resequences received packets of an IP-flow split across the network tunnels.

In some implementations, a usage limit for the a particular network transport is monitored and a progressively larger portion of the traffic to be transmitted is transmitted by one or more of the other network transports as the particular network transport's usage limit is approached.

In some implementations, the expected latency of a packet determined is based upon (i) the expected throughput of that packet's class of service and (ii) the amount of queued data awaiting transmission for the packet's class of service, and the expected latency is estimated for each of the network transports, and the packet is assigned to be carried by the network transport with the lowest estimated latency.

Other embodiments of these aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 2 is a block diagram showing an example implementation for handling outbound traffic in an SD-WAN Router and an SD-WAN Gateway.

FIG. 4 is a table showing an example how HTS can be used to speed up loading of a web page.

FIG. 5 is a table showing an example how a system implementing the disclosed techniques can operate compared to a 4 Mbit/sec LTE WAN, with the table showing varying levels of the HTS being utilized.

Like reference numbers and designations in the various drawings indicate like elements.

DETAILED DESCRIPTION

Geosynchronous satellite networking provides Internet access to more than a million users across the United States. It provides a high-speed service where wired service (e.g., cable modem or fiber) is not available, but has a longer latency than terrestrial alternatives with a round-trip time of roughly 600 ms to 900 ms vs sub-100 ms terrestrial round-trip times. The performance of applications which are latency sensitive, such as web browsing, gaming, VPNs, etc. do not have the same responsiveness as terrestrial access networks but may be preferable for carrying bulk transfers (e.g., streaming video), as it provides good performance that kind of application. This document uses the term, High-Throughput Satellite (HTS) to refer to this form of satellite networking.

Wireless cellular networks provide Internet access with reasonably low latency and provide adequate performance for latency sensitive applications, but often have low bulk transfer throughput speeds and have a usage cost that is typically an order of magnitude more expensive than geosynchronous satellite Internet access. In general, this document uses the term LTE in many examples, as just one example of a wireless cellular network's Internet access or network access that is different from HTS. More generally, within this document, unless otherwise specified, any reference to the term LTE can similarly apply to any access technology (e.g., 3G, 4G, 5G, non-cellular based access technology, etc.) where it is preferable to use HTS to carry bulk transfer traffic to achieve higher throughput and/or obtain lower usage costs. As such, anywhere that LTE is referenced can similarly represent, among other technologies, LEO satellite networking or simply one of many access networks providing lower bit rate than HTS.

Software-defined wide area networking (SD-WAN) technologies can utilize a pair of broadband Internet connections to provide improved VPN private network access or simply improved Internet access. Traffic for individual applications can be carried by the WAN transport (e.g., physical connection type) that is appropriate for that application given its latency, throughput, and other performance requirements.

Some SD-WAN technologies are able to provide a Quality of Service (QoS) overlay with multiple classes of service (e.g., different "priorities") across broadband transports which carry packets without QoS, that is, that carry packets in a first-in, first-out fashion. This can be accomplished by classifying packets and assigning the packets a priority or class-of-service, and running the packets through a priority queue governed by a rate limiter, where the rate limiter is tuned to avoid congesting the broadband transport.

Figure 1:
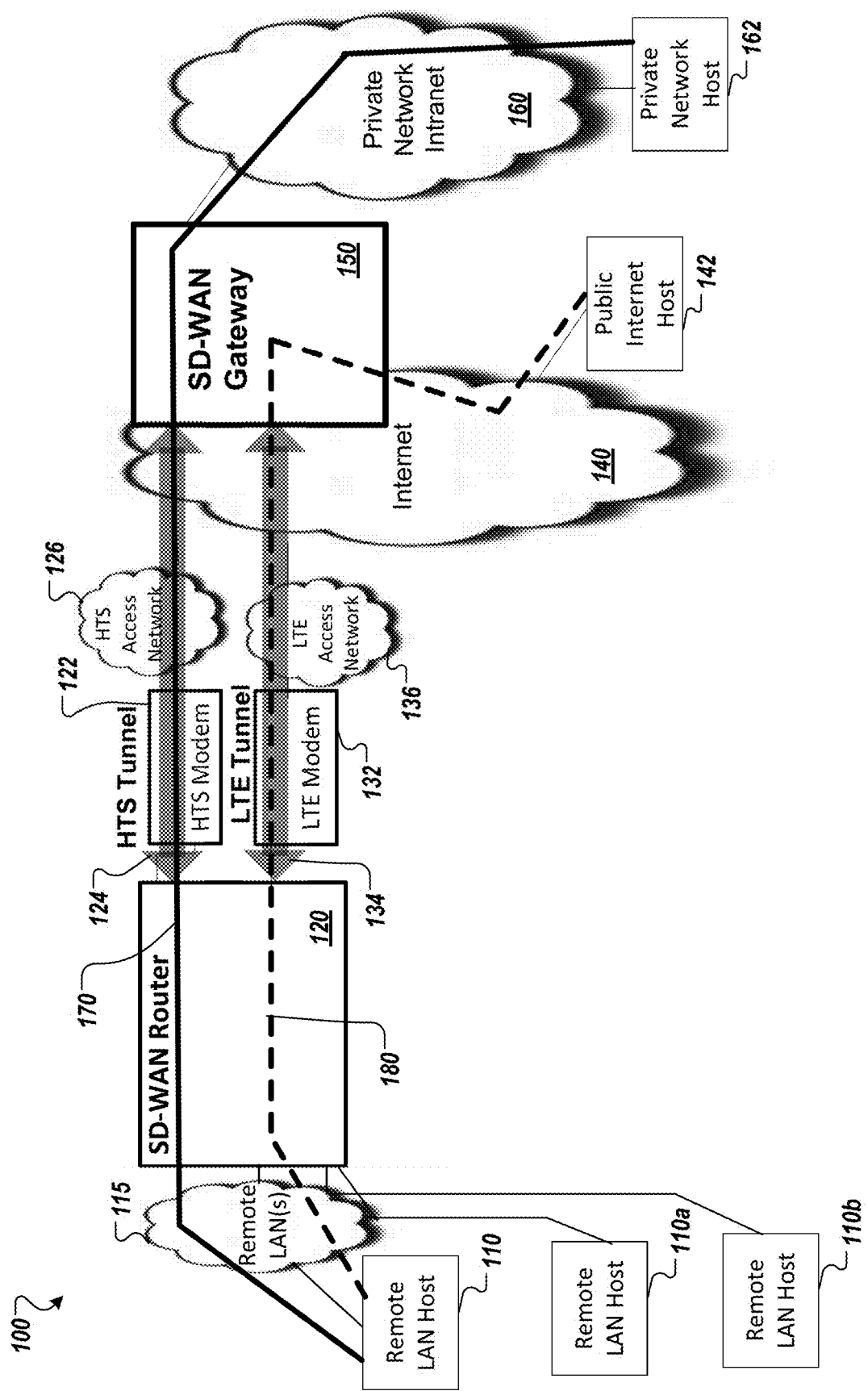
FIG. 1 is a block diagram of an example system that provides QoS Internet or Private network access to a site using High-Throughput Satellite (HTS) and LTE connections to the Public Internet.

FIG. 1 provides an exemplary block diagram 100 of an SD-WAN setup which provides QoS Internet or private network access to a site using HTS and LTE connections to the public Internet (referred to in this document as network transports or WAN transports). While the example of FIG. 1 and other examples herein involve two specific network transports, e.g., HTS and LTE, other physical network access technologies or network transports may be used, e.g., coaxial cable, fiber-optics, digital subscriber line (DSL), 5G cellular, and so on. Any combination of these and other network transports may be used. The example shows the use of two network transports, but more than two transports can be used. In some cases, the techniques can be used with multiple instances of the same type of network transport, for example, to provide load balancing among two network connections of the same type (e.g., two different cable Internet connections).

The example of FIG. 1 includes a Remote LAN Host 110 that communicates with a Public Internet Host 142 and a Private Network Host 162. The communication involves transmitting data over two different network transports, a first network transport (e.g., LTE) accessed using a LTE Modem 132 and a second network transport (e.g., HTS) accessed using an HTS modem 122. The use of the two concurrent connections can be transparent to the Remote LAN Host 110, however. The management of the two transports is done by a SD-WAN Router 120 and a SD-WAN Gateway 150 as discussed below. When the Remote LAN Host 110 sends data packets to transmit, the SD-WAN Router 120 evaluates the packets and network conditions to determine which network transport to use (e.g., HTS or LTE) for each packet or group of packets. For example, the SD-WAN Router 120 can classify packets to specify the classes of service (e.g., levels of latency) needed for each packet, and then select the most appropriate of the available network transports given the class of service. The SD-WAN Router 120 then sends each packet to the SD-WAN Gateway 150 using the selected network transport for the packet, and the SD-WAN Gateway 150 sends the packets on to the appropriate network hosts. A similar, complementary process is used to transmit data on the return direction from the SD-WAN Gateway 150 to the SD-WAN Router 120 and back to the Remote LAN Host 110. As a result of this technique, the SD-WAN Router 120 and SD-WAN Gateway 150 can make use of the concurrently available network transports to achieve the advantages of each.

The Remote LAN Host 110 is a host device or endpoint, such as a desktop computer, a laptop computer, a tablet computer, etc., to which the SD-WAN Router 120 and SD-WAN Gateway 150 provide public Internet access (for example to the Public Internet Host 162 via the Internet 140) and private network access (for example to a Private Network Host 142 via the Private Network Intranet 160). Typically, there are multiple such Remote LAN Hosts, all of which can concurrently receive network access through the SD-WAN Router 120 and the Remote LAN(s) 115. For example, additional hosts 110a, 110b can concurrently transmit and receive data through the SD-WAN Router 120 along with the Remote LAN Host 110.

The HTS Modem 122 and HTS Access Network provide HTS access to the public Internet. The LTE Modem 132 and the LTE Access Network 136 provide LTE access to the public Internet.

The Remote LAN(s) 115 connect the Remote LAN Host 110 to the SD-WAN Router 120. The SD-WAN Router 120 utilizes multiple of broadband transports to provide Wide-Area-Network (WAN) connectivity to the Remote LAN hosts 110, 110a, 110b. The SD-WAN router 120 has the ability to forward packets to/from the Remote LAN hosts 110, 110a, 110b to/from the SD-WAN Gateway 150 flexibly over either of the two broadband transports.

The system 110 uses network tunnelling to connect the SD-WAN router 120 and the SD-WAN Gateway 150. The devices 120, 150 can use a different tunnel for each network transport available. A first tunnel, LTE Tunnel 134 is established for packets exchanged over the LTE transport, and a second tunnel, HTS Tunnel 124, is established for packets exchanged over the HTS transport. The HTS Tunnel 124 and the LTE Tunnel 134 represent the ability of the SD-WAN router 120 and the SD-WAN Gateway 150 to forward packets to each other. The HTS Tunnel 124 and the LTE Tunnel 134 may be IPSec tunnels when privacy is required as when Private Network access is required or may be a GRE Tunnel (e.g., unencrypted) when privacy is not required. Alternatively, they could be another tunneling mechanism or networking mechanism for relaying packets between the SD-WAN Router 120 and the SD-WAN Gateway 150 over their specific access network. In general, traffic for the HTS Tunnel 124 is sent exclusively over the HTS transport, and traffic for the LTE tunnel 134 is sent exclusively over the LTE transport.

The SD-WAN Gateway 150 terminates the tunnels 124, 134 and has the ability to flexibly forward packets to and from the Remote LAN hosts 110, 110a, 110b over the HTS Tunnel 124 and LTE Tunnel 134 via the SD-WAN Router 120. The SD-WAN Gateway 150 may forward packets to and from a Private Network Intranet 160 and its hosts when Private Network connectivity is being provided. The SD-WAN Gateway 150 may forward packets to and from the Public Internet 140 and its hosts (optionally by performing a Network Address Translation function) when Public Internet Access is provided.

The SD-WAN Router 120 and SD-WAN Gateway 150 together implement SD-WAN policies that provide for identifying and classifying unidirectional IP flows and then selecting which Tunnel (HTS Tunnel 124 or LTE Tunnel 134) should carry the IP flow based on the policy and the flow's classification and the measured performance of the WAN transports. Two network connections 170, 180 are shown in the example, but the tunnels 124, 134 can concurrently support transfers for many different connections, including for connections between different LAN hosts.

The example shows a first network connection 170 (e.g., a TCP connection), which can include a pair of unidirectional IP flows, that connects the Remote LAN Host 110 to the Private Network Host 162 where the SD-WAN policies determine to carry the flow's packets over the HTS Tunnel 124 and thus via the HTS broadband transport.

The example also shows a second connection 180 (e.g., a TCP connection), which can include a pair of unidirectional IP flows, that connects the Remote LAN Host to the Public Network host 142 where the SD-WAN policies determine to carry the flow's packets over the LTE Tunnel 134 and thus via the LTE broadband transport.

In the system 100, the SD-WAN Router 120 and SD-WAN Gateway 150 can classify traffic and assign it to different tunnels 124, 134 at different levels of granularity. For example, the tunnel 124, 134 for traffic can be assigned for a connection 170, 180 as a whole, on an IP flow basis (e.g., for each individual IP flow with a connection being assigned separately), for groups of packets, or for individual packets. After traffic is assigned to a tunnel 124, 134, the SD-WAN Router 120 and SD-WAN Gateway 150 can periodically re-evaluate the assignment. In some cases, the re-evaluation occurs periodically, for example, after a predetermined interval of time or after a predetermined amount of data for the connection or IP flow is received or transmitted. In some implementations, the SD-WAN Router 120 and the SD-WAN Gateway 150 may each evaluate data to be transmitted on an individual packet-by-packet basis or as groups of packets. As a result, as incoming packets of a connection are received, each individual packet or group of packets is newly evaluated in view of current network conditions (including the queue depths of the different tunnels 124, 134) and is assigned to achieve the best overall performance, e.g., lowest latency, lowest cost, or other metric, which can vary based on the class of service indicated by the classification of the packets.

As an example, although the connection 180 is initially assigned to the LTE tunnel 124 as illustrated, network conditions may change, e.g., changing a throughput or latency of one of the network transports, changing a level of congestion on one of the network transports, etc. The transmission queue for the LTE tunnel 124 may increase to the point that the overall expected latency, e.g., the time between adding a packet to the transmission queue and receipt of the packet at the gateway 150, is higher for the LTE transport than for the HTS transport. As a result, some or all of the data for the connection 180 may be assigned to the HTS tunnel 122 for the HTS transport. In this way, data for the connection 180 may be carried on either transport that provides the best latency, or may be carried on (e.g., split across) a combination of multiple transports to achieve the best overall performance.

This technology provides for optimized Public Internet access or optimized Private Network access where two Internet connections are utilized, in this example an HTS connection and an LTE connection, where IP flows are classified (and perhaps dynamically reclassified) so that bulk transfers are carried by the lower-usage cost connection (typically the HTS connection) and so the Interactive Traffic is distributed across the two connections to obtain better responsiveness than is achievable with the HTS alone, and in some cases better than LTE alone, while obtaining lower usage costs than is obtainable by LTE alone.

This technology extends the functionality of an SD-WAN solution with a QoS Overlay which leverages the QoS provided by an HTS Access Network and provides for QoS over the LTE access network. It optimizes Interactive Traffic in several ways. First, the router 120 or gateway 150 can cause a startup handshake packet of an Interactive IP-flow to be carried over LTE with a very high-priority (e.g., very low-latency) class-of-service. Examples of startup handshake packets include SYN (e.g., synchronize) packets, SYN-ACK (e.g., synchronize-acknowledge) packets, and ACK (e.g., acknowledge) packets for starting a TCP connection. Second, the router 120 or gateway 150 can cause a non-startup handshake packet of an Interactive IP-flow to be carried with a high-priority (low-latency) class-of-service, but potentially one which has a lower priority than the startup handshake class of service. This non-startup-handshake packet can be sent over the network transport or access network which is estimated to provide lower latency for that packet. The estimation is based on (i) the estimated lightly-loaded or baseline latency of the access network, (ii) the estimated throughput available to carry packets at this particular class-of-service, and (iii) the total amount of data represented by the packets at that class of service which are queued up awaiting transmission. In other words, the estimation can take into account the time needed to clear the transmission queue for a specific class of service on a specific network transport to determine the latency most likely to be actually experienced. Third, on the receiving end of the two Tunnels 124, 134, the receiving device (e.g., either the router 120 or gateway 150) can put an IP-flow's packets back in sequence when its packets are carried by multiple tunnels.

The SD-WAN Router 120 and the SD-WAN Gateway 150 can assign bulk transfer IP flows to be carried over the lower-cost transport, at a lower-priority class of service, so as to reduce the impact of the bulk traffic on the latency experienced by the high-priority (e.g., low-latency) classes of service.

This technology includes provisions for monitoring LTE usage against usage limits and for incrementally reducing the fraction of traffic carried via LTE as the usage limits are approached. One technique for reducing that usage is increasingly overestimating the latency that an Interactive Packet (e.g. a packet of an IP flow classified to be interactive) should expect from the LTE access network. Another technique is increasing the priority levels which are carried over the lower-cost transport (e.g., HTS) and adjusting (e.g., typically reducing) the amount of data carried by an IP flow for the higher-cost transport (e.g., LTE) prior to its demotion to such a level.

The techniques described herein can also be applied to carry out a policy for distributing packets across WAN transports in order to load-balance traffic across a setup where the WAN transports have equivalent usage costs. Various implementations of the technology will be described below.

Although devices 120 and 150 are described as being implemented through SD-WAN techniques, this is only one example. The devices 120 and 150 may optionally be implemented without SD-WAN techniques.

1.1 First Implementation (Without QoS)

This section describes a first implementation that incorporates the technology where both WANs operate carrying packets First-In/First-Out, that this, without QoS or packet prioritization. In this case, the innovative technology is running within the SD-WAN Router 120 and SD-WAN Gateway 150.

1.1.1 Outbound Packet Processing

FIG. 2 is a block diagram 200 showing an example implementation for handling outbound traffic in an SD-WAN Router 120 and an SD-WAN Gateway 150. Both devices 120, 150 perform the same overall steps of receiving a packet, classifying the packet to determine a class of service, selecting one of multiple currently available network transports (e.g., different access networks), queuing the packets according to the network transport and class of service assigned, tunneling the packet for a tunnel that corresponds to the selected network transport, and transmitting the tunneled packet. The SD-WAN Router 120 and the SD-WAN Gateway 150 each include a classifier 205, a WAN selector 210, queues 215a, 215b for each network transport, a tunneler 220a, 220b for each network transport, and one or more network interfaces. The SD-WAN Router 120 has multiple network interfaces 225a, 225b, one for each of the network transports or WAN access networks the SD-WAN Router 120 is connected to. The SD-WAN Gateway 150 needs only a single WAN interface 250 to transmit packets tunneled for the different network transports.

The SD-WAN Router 120 or SD-WAN Gateway 150 receives an outbound packet 201, that is, a packet to be forwarded through one of its tunnels 124, 134. The classifier 205 examines the packet 201 and, based on the packet's content and other relevant packets (especially those from the same IP flow), assigns the packet 201 a class-of-service. For example, the class of service can be selected from among a predetermined set of multiple classes of service, which can be considered to be in one of the following categories, with optionally multiple priorities or multiple classes of service within each category:

Category 1: Very Low Latency Required—where this category is assigned to startup handshake packets of Web Browsing connections and other similar IP flows that require very low latency. VOIP IP flows are another example of an IP flow that requires very low latency.

Category 2: Low Latency Required—where this category is assigned to post-startup handshake web browsing packets and the packets of other IP flows where responsiveness is important and the resulting traffic load is not too heavy.

Category 3: Bulk Transfer—where this category is assigned to IP flows where the amount traffic is expected to be heavy enough that they should be carried by the HTS transport which has a lower usage cost. An example of bulk transfer flows include file transfers and streaming video transfers.

The classifier 205 passes the classified outbound packet 206 to the WAN selector 210 which is responsible for assigning the packet to one WAN or the other based on its classification. This takes place as follows:

Very Low Latency Required packets are assigned to the LTE transport.

Low Latency Required packets are assigned to the transport which is expected to provide the packet the lower latency overall latency.

Bulk Transfer packets are assigned to the HTS transport as it has lower usage costs than the LTE transport.

The WAN selector 210 passes the assigned & classified outbound packet 211a/211b into the assigned transport's queue 215a/215b which holds the packet until the rate limiter allows it to be forwarded to its transport's tunneler 220a/220b. The queue 215a/215b includes a rate limiter that typically includes the expected overhead induced by its tunneler 220a/220b. The rate limit is tuned to match the expected throughput to be provided by its WAN transport.

With this technology, the WAN selector 210 or the classifier 205 tags the packet with enough additional information that the peer may resequence an IP-flow's packets. This typically involves tagging the packet with a per-IP flow sequence number that increments with each of the flow's packets and optionally an IP flow identifier. The sequence number is specified using enough bits so as to accommodate the maximum difference in delay expected to be experienced by the two WAN transports.

The tunneler 220a/220b (e.g., either for the HTS or LTE transport) prepares the packet for transmission across its WAN to be delivered to its peer. The peer is the other corresponding element of the system, e.g., the peer of the SD-WAN Router 120 is the SD-WAN Gateway 150 and the peer of the SD-WAN Gateway 150 is the peer of the SD-WAN Router 120. This typically involves "tunneling" the packet, which means having the packet be carried as the payload of another packet. The tunneled packet 221a/221b includes the resequencing information determined for that packet by the WAN selector 210 or classifier 205.

The tunneler 220a/220b passes the tunneled packet 221a/221b to its transport's network interface. For the SD-WAN Router 120, this means transmitting the packet using the HTS interface ("I/F") 225a or the LTE I/F 225b, depending on which WAN was chosen by the WAN selector 210. The SD-WAN Gateway 150 uses the WAN I/F 250 regardless of which WAN was selected. The network interface then actually transmits the packet 221a/221b so that it gets carried through the access network on route to the peer.

1.1.2 Inbound Packet Processing

Figure 3:
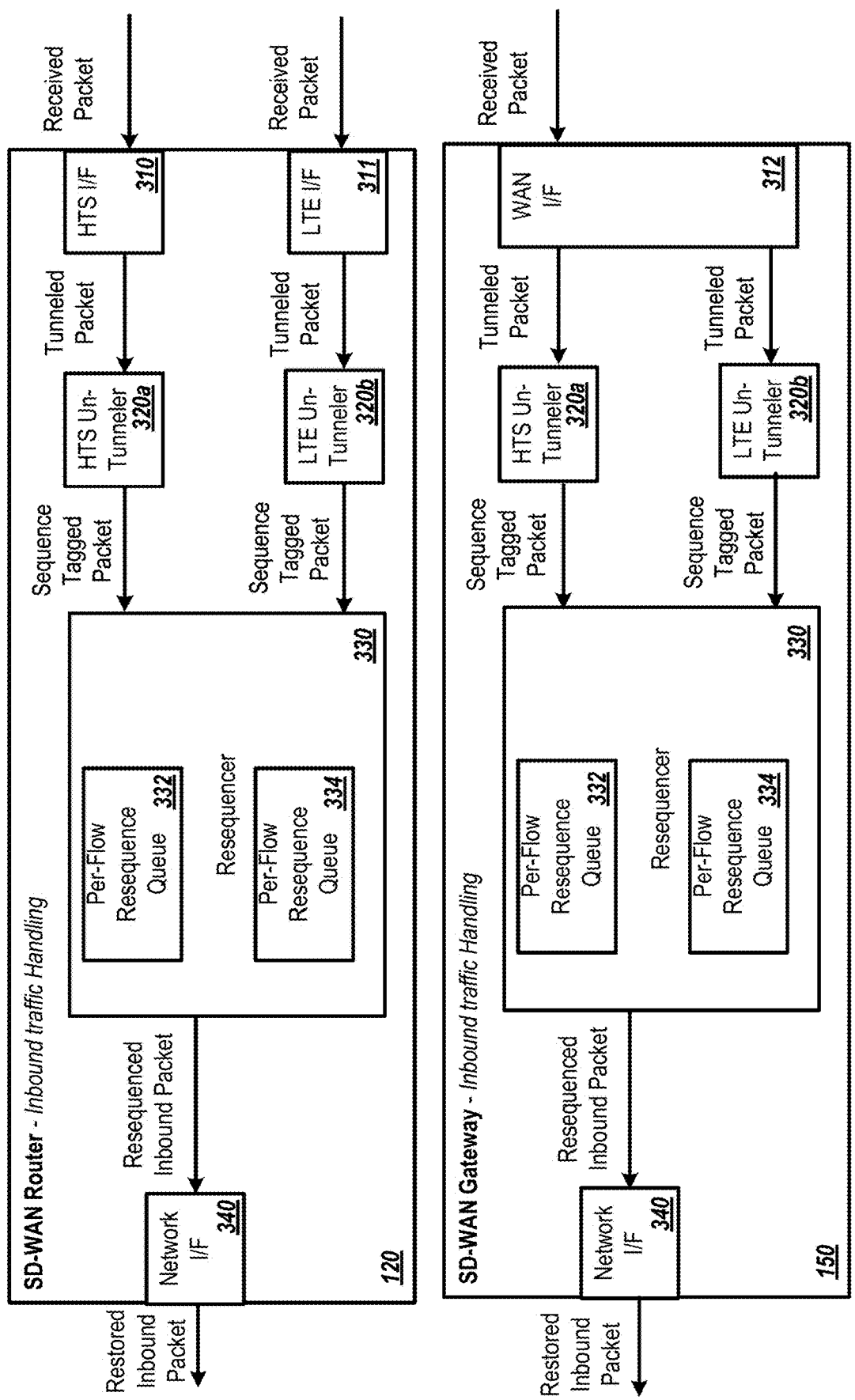
FIG. 3 is a block diagram showing an example of an implementation for handling inbound traffic in a SD-WAN Router and an SD-WAN Gateway.

FIG. 3 is a block diagram of the implementation for handling inbound traffic in both the SD-WAN Router 120 and the SD-WAN Gateway 150. The SD-WAN Router 120 and SD-WAN Gateway 150 both perform the same overall process of receiving a tunneled packet, un-tunneling the packet, resequencing the packet into its appropriate IP flow, providing the resequenced input packet to the network interface, and then sending the restored inbound packet (e.g., in its proper place in the sequence of the IP flow) on to the destination. For the SD-WAN Router 120, the destination is the LAN Host 110, and for the SD-WAN Gateway 150 the destination can be the Private Network Host 162 or the Public Internet Host 142.

For both the SD-WAN Router 120 and the SD-WAN Gateway 150, receiving data starts with receiving a tunneled packet is received by the appropriate interface and the SD-WAN Router 120 or SD-WAN Gateway 150 passes the packet to that packet's Un-tunneler 320a/320b. The SD-WAN has a separate HTS interface 310 and LTE interface 311 while the SD-WAN Gateway 150 has a single WAN interface 312.

The Un-tunneler 320a/320b, as its name implies, un-tunnels the packet restoring the original packet as it was prior to being tunneled and tags that packet with its resequencing information. The Un-tunneler 320a/320b passes the packet to a Resequencer 330.

The Resequencer 330 dynamically allocates a Per-IP-Flow Resequence Queue 332, 334 for each IP flow and passes the Sequence Tagged Packet into that Queue. Two Per-IP-Flow Resequence Queues 332, 334 are shown for each device 120, 150, but any number of such queues may be allocated and used to correspond to the number of IP flows that are active. Resequencing is needed because an IP flow's packets may be carried across different paths and so may arrive out of sequence. The packet immediately passes through the resequence queue when it is in-sequence. When this occurs, additional packets which were queued out-of-sequence may become in-sequence and also be passed forward. When a packet is out-of-sequence, the Per-IP-Flow Resequence queue 332, 334 stores the packet where it waits for the earlier packets to arrive and make it in-sequence and able to be forwarded. The Per-IP-Flow will forward a stored packet when it has been stored long enough that it is likely that the missing packets were lost. This duration can be based on a fixed timeout or be based on measurements of the maximum time that a packet has recently arrived late thereby allowing out-of-sequence packets to be forwarded (if they were still stored).

A Resequenced Inbound Packet is routed to the appropriate network interface 340 and forwarded to its next hop. The SD-WAN Gateway 150, when forwarding a packet onto the public Internet may optionally perform a Network Address Translation (NAT) or Network Address Port Translation (NAPT) operation thereby minimizing the number of Public IP Addresses the SD-WAN gateway 150 must be allocated to support a given number of SD-WAN Routers (e.g., routers 120).

1.1.3 Low Latency Required WAN Selection

This section describes how a WAN is selected for a Low Latency Required packet when the technology is running in the without QoS.

This section does the high-school math associated with determining which WAN of a pair of WANs should carry a packet in order to minimize latency when the following information is available for each WAN:

- transmission rate—which is that WAN transport's rate limiter setting.
- latency—which must be measured or configured. This is the latency a packet is expected to experience once it has actually been transmitted across by the SD-WAN router or SD-WAN Gateway 150.
- amount of data queued ahead of the packet for transmission.

This computation uses the following nomenclature:

- The low-latency WAN (typically LTE) is referred to as WAN A.
- The WAN A can transmit rate is AR bits/sec.
- The WAN A latency is AL seconds.
- The WAN A queue depth is AQ bits.
- The long-latency, lower usage cost WAN (typically HTS) is referred to as WAN B.
- The WAN B can transmit rate is BR bits/sec.
- The WAN B latency is BL seconds.
- The WAN B queue depth is BQ bits.

Assuming the size of an individual packet is negligible:

- The expected latency via WAN A is: AL+AQ/AR.
- The expected latency via WAN B is: BL+BQ/BR.

The WAN selector 210 selects the WAN with the lower expected latency.

FIG. 4 illustrates how the technology allows HTS to speed up web page retrieval, especially when the LTE is not operating at high speed or when the web page size is relatively large (>1 MB).

The example of FIG. 4 shows a table 400 that includes various columns showing different types of data that can be used by the system. Various rows 401*a*-401*h* represent different example scenarios and the values and WAN selection for each. Column 402 indicates the WAN (e.g., LTE vs HTS) that is determined to have the lowest expected latency, and so is ultimately selected based on the other information. Column 404 includes the value for the LTE expected latency, and column 406 indicates the HTS expected latency. The remaining columns show the target bit rate, the baseline latency, and the queue depth for each of the different network transports evaluated. For example, column 408 indicates the target bit rate for LTE, column 410 the baseline latency for LTE, and column 412 indicates the queue depth for LTE. Column 414 indicates the target bit rate for HTS, column 416 the baseline latency for HTS, and column 418 indicates the queue depth for HTS.

In some implementations, variable selection of network transport is used only for traffic of certain classes of service, such as an intermediate class of service. The example of FIG. 4 can thus show the selection of the WAN for the "low latency required" class, but the higher-priority "very low latency required" class can be statically assigned to the LTE connection, and a low-priority class can be statically assigned to the HTS connection.

In some implementations, the throughput values indicated in columns 408 and 414 each have the same value as, or each is derived based on, the data rate used for the rate limiter of the WAN's corresponding queue 215*a*/215*b*. In some implementations, the throughput indicated in columns 408 and 414 indicates the total throughput of the network transport.

In other implementations, the throughput indicated in columns 408 and 414 can indicate a portion of the total throughput. For example, some portion of the overall throughput of the low-latency LTE connection can be reserved for higher-priority classes of service. In other words, the throughput represented in column 408 (or for any other network transport) may not represent the full available throughput, but instead represent an portion of the overall throughput allocated for use by a particular class of service. For example, if there is a 2 Mbps LTE connection, less than that, such as 0.5 Mbps, may be allocated for the current class of service being considered. The throughput values for network transports may vary over time, e.g., as different fractions of the total network throughput are allocated for a class of service (e.g., in response to changes in traffic patterns or queue contents of higher-priority classes of service) or as service in the network changes (e.g., changes in the communication channel such as congestion, interference, etc.).

The baseline latency of a network transport (e.g., in columns 410 and 416) represents the transmission latency when the transmitting device is lightly loaded or has no load. This can represent the standard or average amount of time for a packet to travel over the network transport from the SD-WAN Router 120 (e.g., on one side of a tunnel 132, 134) to the SD-WAN Gateway 150 (e.g., which terminates the tunnel 132, 134), or vice versa. This baseline latency generally does not change unless the properties of the network transport access network change. Thus, as shown in FIG. 4, the values in columns 410 and 416 do not vary with the queue depth or over time in the example. Nevertheless, changes in the properties of the WAN transports may be detected and used to update the values of baseline latency used.

The queue depth values in columns 410 and 418 indicate the amount of data that is waiting to be transmitted over the corresponding WAN transport. In some implementations, this can be a total amount of queued data across all classes of service. In some implementations, to better implement quality of service functionality such as the second implementation discussed below with respect to FIGS. 6 and 7, the queue depth can indicate an amount of queued data for the current class of service and any higher priority classes, but not for lower-priority classes which can be bypassed in a priority queueing approach.

The amount of data in the queues 215*a*/215*b* can vary significantly over time, and can change very rapidly. The amount of data in the queue 215*a*/215*b*, already in the queue ahead of the current packet that the WAN selector is determining to place on a network transport, can significantly affect the expected latency for a network transport. For example, in the scenario of row 401*a*, the queues 215*a*/215*b* are empty (queue depth is zero) for both HTS and LTE. The result is that the expected latencies are the same as the baseline latencies. In this case, the LTE expected latency is less than the HTS expected latency, so the WAN selector 210 selects LTE for the packet.

In the scenario of row 401*b*, there is data in the LTE queue 215*b* waiting to be transmitted, and this increases the LTE expected latency. Given the queue depth (e.g., 20,000 bytes) and the target bit rate (e.g., 0.5 Mbps, representing the expected or allocated throughput), the system determines that it will take 320 ms to clear the queue 215*b* and transmit the data that is currently waiting to be transmitted. This 320 ms delay, plus the 60 ms baseline latency, results in the expected latency of 380 ms for LTE. In this case, the LTE expected latency is higher than the HTS expected latency, so the WAN selector 210 selects HTS for transmitting the packet.

The examples in the other rows 401c-401h show different scenarios, e.g., different queue depths and different target bit rates, resulting in different expected latencies and thus different WANs being determined to be selected. This shows that the best WAN to use for a given packet can vary depending on conditions. In some implementations, the WAN selector 210 can determine expected latencies for individual connections, IP flows, groups of packets, or individual packets, to account for rapid changes in transmission characteristics. However, to reduce the amount of computation needed, the calculations of expected latencies and corresponding selection of a WAN for a class of service based on the expected latencies can be done and then reused for multiple WAN selection decisions. For example, the calculations may be done at a first time, and then reused to select a WAN over a predetermined subsequent period of time (e.g., the next 50 ms) or to perform WAN selection for a predetermined amount of incoming data (e.g., the next 100 kB or an amount of data that, according to the target bit rate, would take a predetermined amount of time, such as 50 ms, to transmit). As discussed with respect to FIG. 7, the decision about which network transport is best for a given class of service can be stored in a table 620 and re-used until the condition or trigger for recalculation of the table contents occurs. In this situation, the various rows 401a-401h of FIG. 4 can represent different instances of recalculation of the WAN selection for an intermediate-priority class of service, showing that as conditions change the specified WAN to select can also change.

The expected operation of the technology carrying a secure web page from a Public Internet Web Server to the Remote LAN Browser is:

LTE becomes saturated (as it would be if it were the only WAN carrying traffic) AND HTS carries a significant fraction of the traffic (as makes sense given that startup handshakes are carried at high priority via LTE and traffic is diverted to HTS as soon as 350 ms of the web page builds up). In the example, the HTS should start carrying significant traffic after just 175 KB assuming:

the web server path to the SD-WAN Gateway 150 is much faster than the LTE WAN and the LTE WAN is operating at 4 Mbit/sec.

the HTS one-way latency is as described.

FIG. 5 is a table showing an example how a system implementing the disclosed techniques can operate compared to a 4 Mbit/sec LTE WAN, with the table showing varying levels of the HTS being utilized. The rows 501a-501d show different response times (column 510) for different levels of utilization of the HTS transport (column 520) in combination with the LTE transport. This shows that, for the same web page, with the same amount of data to transfer (e.g., 10 MB) in each scenario, various levels of performance improvement can be achieved using at least portions of the HTS transport in combination with the LTE transport, e.g., spreading the data transferred for the web page over both transports using both tunnels 124, 134 as discussed for FIG. 1.

1.2 Alternative Implementation (without QoS)

An alternative implementation is like the previous implementation only where there is no queue 215a/215b as shown in FIG. 2. The operation of the system is the same, except that frequent one-way latency measurements are performed and recent measurements are used to determine a WAN's expected latency, and thus to make an accurate WAN selection for Low Latency Required packets.

1.3 Second Implementation (with QoS Overlay)

This section describes a more advanced implementation of the technology that has some features that provide advantages for deployment in commercial settings. The major difference from the first implementation is that a QoS overlay is in-place, allowing packets to be prioritized (given a class-of-service which effectively guides the packet's transmission across an access network). The second implementation also runs within the SD-WAN Router 120 and SD-WAN Gateway 150.

Figure 6:
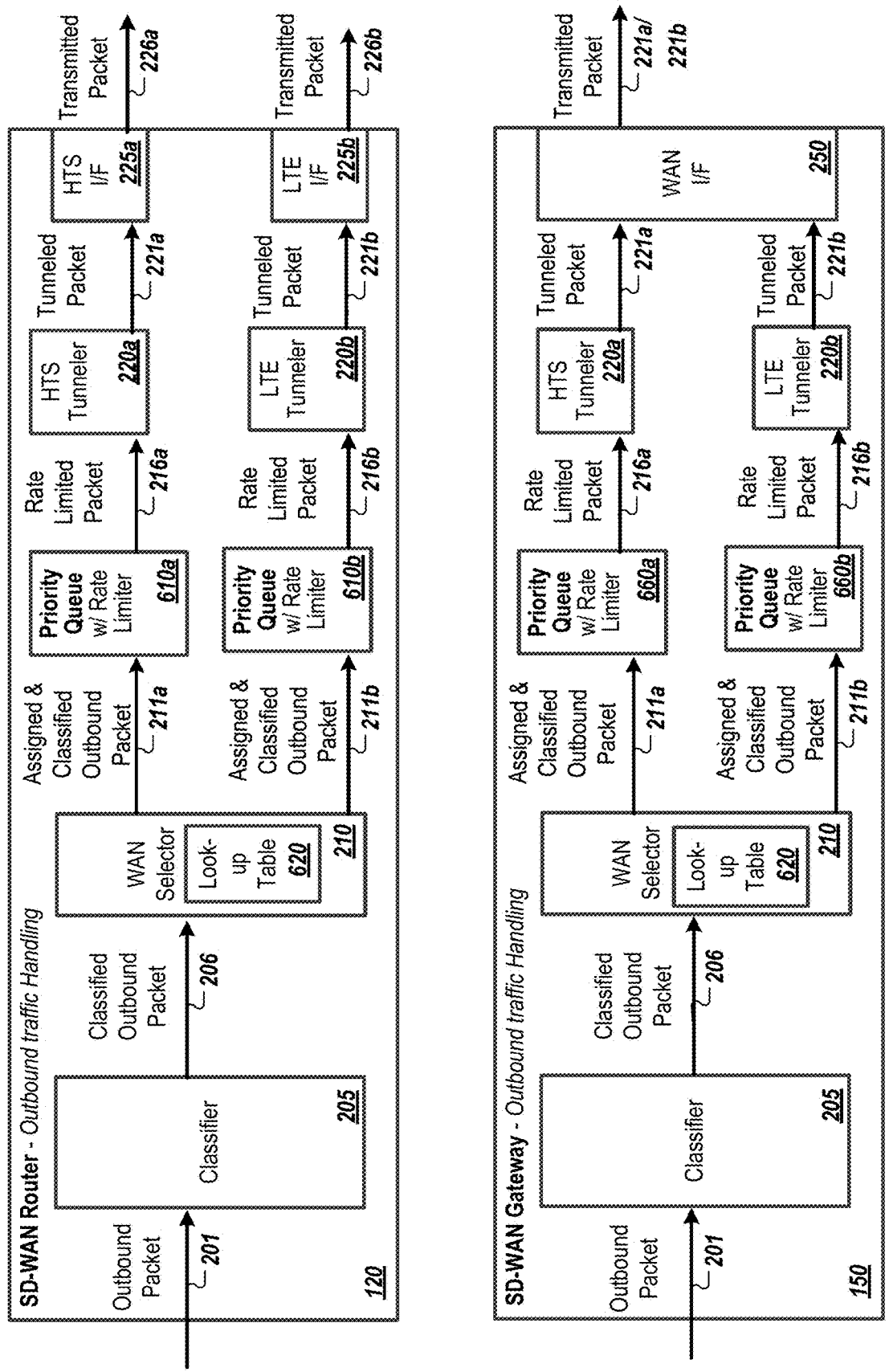
FIG. 6 is a block diagram shown an example of a second implementation for handling outbound traffic in a SD-WAN Router and a SD-WAN Gateway.

The second implementation can include features as discussed above for FIGS. 1-5, but modifies and enhances the system to provide QoS functionality and improve efficiency. As shown in FIG. 6, the transmission queues 215a/215b that store data to be transmitted can be replaced with priority queues 660a/660b. In addition, the WAN selector 210 can store and update a table 620 to improve efficiency of WAN selection operations.

1.3.1 Second Implementation Outbound Packet Processing

FIG. 6 provides a block diagram of the second implementation for handling outbound traffic in both the SD-WAN Router 120 and SD-WAN Gateway 150.

The key difference between the first implementation and the second implementation is the second implementation's use of a Priority Queue 660a/660b rather the first implementation's use of a queue 215a/215b that has no prioritization. The Priority Queue w/Rate Limiter limits the transmission of packets to stay under its rate limit and selects the next packet to be transmitted according to a policy. The policy may be a strict priority policy or may be one which favors higher priority packets at the expense of lower priority packets without completely skipping lower priority packets when the rate limiter is saturated. In addition, the second implementation, when running with an access network that supports QoS internally, a differentiated services code point (DSCP), e.g., a type of packet header value, marks packets with their desired class-of-service, thereby signaling the access network the class of service it should provide that packet. This DSCP value may be an input to the classifier 205 or may be used to bypass the classifier by assigning a classification directly based on the DSCP value.

The classifier 205 examines the packet and based on the packet's content and other relevant packets (especially those from the same IP flow) assigns the packet a class-of-service as it did with the first implementation although also tagging the packet with the full amount of prioritization information so that when it reaches its Priority Queue w/Rate Limiter 660a/660b that queue may schedule the packet's transmission versus other packet's transmission so as to implement the packet's class of service.

The classifier 205 passes the classified outbound packet 206 to the WAN selector 210 which is responsible for assigning the packet to one WAN or the other based on its classification. This takes place as follows:

Very Low Latency Required packets are assigned to the LTE transport. The Priority Queue ensures that these packets get the lowest latency of any packets by giving their transmission preference over other packets.

Low Latency Required packets are assigned to the transport which is expected to provide the packet the lower latency overall latency. The mechanism for determining which path is expected to have lower latency is modified (and made more complex) by the use of the QoS overlay and its Priority Queue 660a/660b. This is discussed further below.

Bulk Transfer packets are assigned to the HTS transport as it has lower usage costs than the LTE transport. The Priority Queue ensures that those Bulk Transfer packets do not significantly impact the latency experienced by higher priority packets by giving higher priority packets preference but without starving Bulk Transfer packets of all bandwidth.

As discussed further below, the WAN selector 210 can improve efficiency and reduce processor using a look-up table 620 to determine the appropriate network transport (e.g., HTS vs. LTE) for the class of service of the classified outbound packet 206. Rather than compute the expected latencies of the network transports each time a WAN selection decision is made, the appropriate WAN for each class of service can be selected and the selection results stored in the table 620. Then, each time a WAN selection decision is made (e.g., for a connection, an IP flow, a group of packets, or an individual packet), the WAN selector 210 chooses the network transport that the table 620 indicates for the class of service indicated by the classifier 205.

The WAN selector 210 passes the assigned & classified outbound packet 211*a*/211*b* into the assigned transport's Priority Queue 660*a*/660*b* which holds the packet until the rate limiter allows it to be forwarded to its transport's tunneler 220*a*/220*b*. The rate limiter typically includes the expected overhead induced by its tunneler 220*a*/220*b*. The rate limit is tuned (by a means external to this technology) to match the expected throughput to be provided by its WAN transport.

There is no change to the Tunneling of packets (other than optionally DSCP or otherwise tagging the packets so that the Access Network can give them their appropriate class of service) other their transmission. The packets remain tagged with resequence information.

1.3.2 Second Implementation Inbound Packet Processing

The second implementation's processing of inbound packets is the same as the first implementation's processing of inbound packets.

1.3.3 Second Implementation Low Latency Required WAN Selection 1.3.3.1 Basis for Increased Complexity Compared to the first implementation, the second implementation has the following complicating factors that follow from having multiple priority levels:

For a given priority level, what a WAN's transmit rate will be varies as higher priority traffic steals capacity from the rate limit or target bit rate.

How much data a WAN effectively has queued in front of a packet at a given priority level varies—as higher priority packets may come in and be serviced while a given packet is waiting to be transmitted. These two factors are related.

In addition, it is desirable to minimize per-packet processing (CPU loading) as part of minimizing the cost of the SD-WAN Router 120 and SD-WAN Gateway 150 to support a given level of top-speed throughput.

It is also desirable to be able to dynamically adjust the relative amount of LTE usage so as to avoid service plan usage limits or simply to reduce the resulting usage costs. This is done by trading off LTE usage against reduced application-level responsiveness.

1.3.3.2 Minimizing CPU Loading

Figure 7:
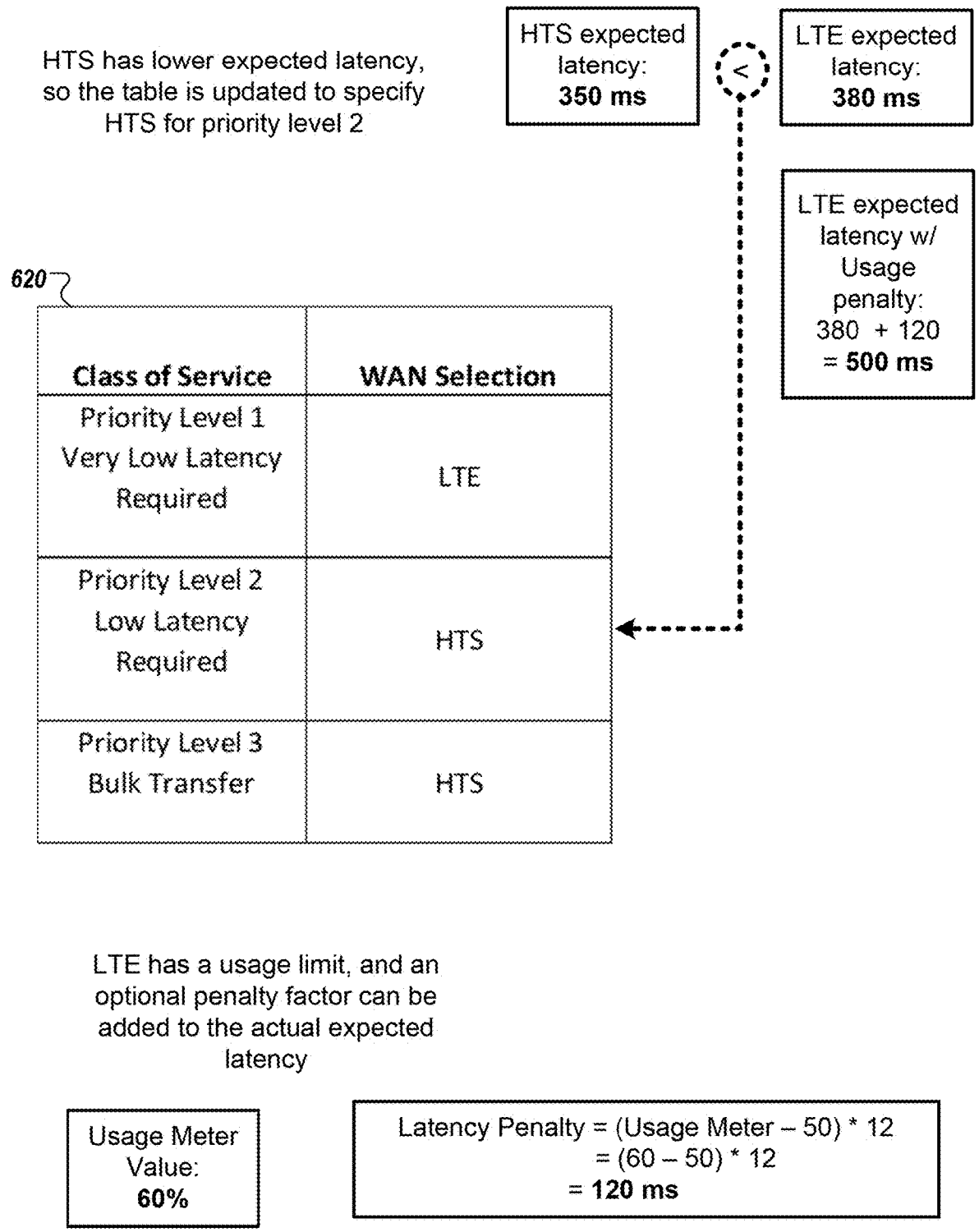
FIG. 7 is an example of a table that can be used to select a network transport.

FIG. 7 is an example of a table 620 that can be used to select a network transport. This table 620 can be used by the WAN selector 210 of FIG. 6, and can be dynamically updated as discussed below. The illustrated example table 620 in FIG. 7 shows three different classes of service, but information for more or fewer classes of service may be included.

The second implementation minimizes CPU loading by using a simple table lookup with an entry in the table 620 for each priority level (also known as class-of-service) to schedule a packet for either HTS or LTE transmission. A table entry may be frequently updated. One example is to update the entry at a default interval, such as 50 ms, or once a predetermined number of packets, e.g., a default of 100, are processed, whichever comes first based on that priority level's expected latency. Another example policy for determining is to update a table entry once every 50 ms or each time 50 ms of data at the minimum of the rate limits is received by the WAN selector 210. The quantity of data portion of this policy exists to ensure that a table entry is updated when a spike of traffic arrives that cause the latency of the table entry to increase significantly.

With a 50 ms update period it is unlikely that a priority level's relative latency of the two WANs will shift by significantly more than 50 ms between updates. There is a tradeoff to be made between the CPU associated with recalculating a table entry which scales with the frequency of update vs the reduced CPU associated with doing a simple table lookup using the table 620 rather than spending the CPU on calculating the relative expected latency of the two WANs.

1.3.3.3 WAN Selection Table Entry Calculation

The WAN selection indicated by an entry in the table 620 is determined based on finding the minimum estimated latency of each WAN transport. In some implementations, one or more of, or even all of, the table entries are determined based on expected latency calculations, such as the type of expected latency calculation results shown in columns 404 and 406 of FIG. 4. In some implementations, one or more of the table entries are fixed or determined based on factors other than expected latency.

In some implementations, the WAN selections indicated by the table 620 are fixed for some classes of service, such as the highest-priority class of service and the lowest-priority class of service. In the illustrated example of FIG. 7, the WAN selection for priority level 1 is fixed, and the WAN selection for priority level 3 is also fixed. Table entries for one or more intermediate-priority classes of service may have a WAN selection that varies according to network conditions as discussed below. In the illustrated example of FIG. 7, the WAN selection for priority level 2 is variable and can change as the table 620 is updated based on changing conditions (e.g., such as changing latency, throughput, transmission queue contents, etc. for the different WAN transports).

For the priority level 2 entry, the WAN selection in the table is reassessed each time the table is updated. The WAN selection for priority level 2 is the WAN that provides the lowest expected latency, which is generated to include the delay needed to transmit data already waiting in the transmission queue, e.g., data in the priority queue 660*a*/660*b* for priority levels 1 and 2 that would need to be transmitted before a newly added packet for priority level 2 would be transmitted. For example, taking the case of the second entry from FIG. 4, where LTE latency is 380 ms and HTS expected latency is 350 ms due to the effects of the LTE queue, the HTS network transport provides a lower-latency transmission option and is therefore selected for the priority level 2.

The WAN selection for priority level 2, representing an intermediate priority of low Low Latency Required, can be determined as follows.

The WAN selection is the WAN with the lowest estimated latency where that is based upon:
An optional usage-limit-based extra latency factor, described later in this document. In effect, the extra latency factor serves as a penalty for a network transport, e.g., to artificially inflate the latency estimate when cumulative usage of that network transport over a time period exceeds a threshold or approaches a usage limit.
The WAN's baseline latency, e.g., the latency a packet experiences across the access network apart from congestion from exceeding its capacity. For example, the baseline latency can be the latency due to actual transmission, which is achieved when the transmission queue is empty (e.g., the transmission may be initiated immediately).
The estimated queuing latency (e.g., delay due to data ahead of the packet in the transmission queue) based on the:
packet priority's queued backlog (number of bytes queued at that priority level), and
effective capacity of that WAN at that priority level (acceleration tunnel rate limit minus the recent higher priority bit rate).

The optional usage limit-based extra latency factor is discussed later in this application and is used to adjust the fraction of traffic carried by the higher-usage cost LTE WAN transport. For example, the extra latency factor can be used as a penalty to steer traffic away from a network transport that, although providing low latency, is approaching a usage limit.

Although the example dynamically changes the WAN selection for only one class of service, the selections for other classes of service may be determined in the same manner. In that case, different latency estimates will be determined for each different class of service because the effective queue depths for the network transports will be different for different priority levels. For example, for priority level 1, the highest priority level, the queue depth is the amount of data to transmit for priority level 1. For other classes of service, the queue depth includes queued data for that priority level and all higher-priority classes of service. For example, the queue depth for priority level 2 includes the queued data for priority level 1 and priority level 2.

The WAN's baseline latency is provided by the QoS overlay or by configuration parameter or another mechanism. The packet priority's queued backlog is read from the priority queue 660a/660b.

The determination of a priority level's effective capacity, when the priority queue 660a/660b operates reasonably closely to a strict priority policy for the higher priority levels, takes place as follows:
The starting point is the rate limit of the Priority Queue/w Rate Limiter 660a/660b.
The priority queue 660a/660b maintains the recent throughput of each priority level where recent is calculated, for example, by sampling the number of bytes carried once every N milliseconds (e.g. 10 milliseconds) and then computing the average bit rate based on the previous M (e.g. 5) samples.
The effective capacity is the rate limit of the priority queue 660a/660b limit minus the sum of the recent throughput of the higher priority levels.

1.4 Usage Limit Monitoring

Many LTE service plans involve granting the customer a specified amount of usage per month (measured typically in GB) where the LTE performance is sharply reduced should that usage be exceeded. The start of the month, as far as that limit is concerned, varies from subscriber to subscriber and is referred to by this document as the billing cycle start. This section defines the mechanism the second implementation optionally uses to guide LTE usage in such a way as to avoid exceeding the monthly usage limit.

A preferred implementation of this involves:
Maintaining two different LTE usage measurements:
Billing Cycle Month-To-Date
Rolling Recent Usage (based on the usage experienced over the last N, default=72 hours).
Evaluating those two usage measurements relative to the usage limit, for example:
Month-To-Date Usage Percent=100*(the month to date usage*seconds so far this month)/(Usage Limit*number of seconds in the month). This has a value between 0 and 100 when under the limit and a value over 100 when over the limit. At the end of the billing-cycle month it provides the percentage of the monthly limit used that month).
Rolling Recent Usage Percent=100*(Rolling Recent Usage)/(Usage Limit*number of seconds in the recent usage period/number of seconds in the month). This has a value between 0 and 100 when recent usage is under the pro-rata usage expected for the recent usage period and a value over 100 when over the limit.

A final value Usage Meter setting is calculated from these two usage percentages as follows:
Use just the Rolling Recent Usage Percent*Rolling Recent Oversubscription Factor for the first N (default=5) days of the billing cycle month. The Rolling Recent Oversubscription factor is a configurable value (default=2.0) which allows the user to exceed his pro rate recent usage by that amount.
Use the maximum of the Month To Date Usage Percent and the Rolling Recent Usage Percent*Rolling Recent Oversubscription Factor for the rest of the month.

1.5 Usage Limit Overage Avoidance

The Usage Meter value (e.g., a percentage of data usage consumed) is used to adjust the WAN Selection Table calculation by:
Adding a penalty value, calculated based on the Usage Meter value, to the LTE expected latency of each priority level. By increasing the LTE expected latency with a penalty term, as the Usage Meter increases the LTE WAN transport carries less and less traffic. For example, the function for calculating LTE expected latency can increase the amount of penalty as the usage increases. An example of a function to determine the penalty value is:
Add a penalty of 0 ms to the LTE expected latency when the usage meter is less than 50 (e.g., less than 50% of the maximum has been used); and
Apply a penalty equal to (Usage Meter Value−50) *Extra Latency Attribution Factor (default=12.0). With these values, the calculated LTE expected latency is boosted by a maximum of 600 ms when the Usage Meter is at 100 (indicating that the unit is on track to fully utilize its usage limit). The amount of the penalty increases gradually from 0 ms added at 50% of the data amount used up to 600 ms (e.g., 50*12.0 ms) when 100% of the data amount is used.

An alternative function is to use a lookup table to produce another configurable function to change how the LTE expected latency is increased.

Another option is to recategorize at least some packets to a lower priority level, causing them to be better candidates for transmission on another transport. For example, the system can recategorize some or all very low latency IP packets to be Low Latency IP packets (e.g., one level of priority lower) in response to determining that the Usage Meter value exceeds a threshold, such as 120. This causes virtually all traffic to be carried by the HTS transport. For a more gradual approach, rules or functions for classifying traffic into the highest priority class or classes can be adjusted at multiple points in time or as certain thresholds are reached as the usage meter value increases.

As another example, the Usage Meter value can be used to adjust the LTE usage by:

Adjusting which classes of service fall into the Bulk Transfer category and thus are carried exclusively by the HTS transport; and/or Adjusting the classification of flows to increase the amount of traffic which is classified into one of these Bulk Transfer category.

One embodiment for this involves having the classifier classify packets into one various classes in a predetermined set of classes. The classes can represent different data types (e.g., interactive vs. bulk data), different levels of interaction (e.g., light interaction vs. heavy interaction), different levels of priority (e.g., gold, silver, bronze, etc. below representing high, medium, and low priority below), etc., and various different combinations or subcombinations of those attributes. For example, the following classes of service may be used:

Light-Interactive—which is always put into the Very Low Latency Required category.

Heavy-Interactive Gold—which is typically put into the Low Latency Required category but which may be put in the Bulk Transfer Category. An IP flow is categorized for Heavy-Interactive Gold in this embodiment when it is carrying the startup handshake packets of an HTTP or HTTPS connection and the first data-carrying packets of an HTTP or HTTPS transaction.

Heavy-Interactive Silver—which is typically put into the Low Latency Required category but which may be put in the Bulk Transfer Category. An IP flow is categorized as Heavy Interactive Silver after it has carried enough data HTTP or HTTPS traffic that it can no longer categorized as Heavy-Interactive Gold. The result of this is that startup handshakes and small HTTP and HTTPS transactions receive preferential treatment over larger transactions thereby reducing the response time for those smaller transactions.

Heavy-Interactive Bronze—which is typically put into the Low Latency Required category but which may be put in the Bulk Transfer Category. An IP flow is categorized as Heavy-Interactive Bronze when after it has carried even more data thereby giving preferential treatment to medium sized transactions.

Bulk-Gold—which is always put into the Bulk Transfer Category. These Bulk classes of services are reserved for IP flows which are confirmed to be carrying large amounts of traffic such as streaming video where it is unlikely that responsiveness is critical.

Bulk-Silver—which is always put into the Bulk Transfer Category.

Bulk-Bronze—which is always put into the Bulk Transfer Category.

This embodiment uses the amount of data and/or the rate of data an IP flow has recently carried as one criteria for selecting its class of service where increasing amounts demote an IP flow from a high priority to a lower priority. For protocols, such as HTTP and HTTPS, where individual transactions can be identified the amount of data within a transaction (or the recent rate of transfer within a transaction) can be part of the criteria for adjusting an IP flow's class of service.

This embodiment further involves having multiple Usage Adjustment Level settings where increasing adjustment levels increase the fraction of traffic carried by the HTS transport. The embodiment progressively shifts to higher and higher Levels to shift more and more traffic to HTS as the Usage Meter setting crosses increasing thresholds. An example of the levels is shown as follows:

Level 1—default ASAP operation where the various classes of service operate with their default Very Low Latency Required, Low Latency Required or Bulk Transfer categories.

Level 2—shifts downstream Heavy-Interactive Bronze to be categorized for Bulk Transfer where more traffic is classified as Heavy-Interactive Bronze by reducing the byte count to demote an IP flow from a higher class-of-service to Heavy-Interactive Bronze. The adjustment of that threshold is described in the next section.

Level 3—Level 2 AND shift downstream Heavy-Interactive Silver to be categorized for Bulk Transfer where more traffic is classified as Heavy-Interactive Silver by reducing the byte count to demote an IP flow from a higher class-of-service to Heavy-Interactive Silver. The adjustment of that threshold is described in the next section.

Level 4—Level 3 AND shift downstream Heavy-Interactive Gold to be categorized for Bulk Transfer.

Level 5—Shift all traffic to the Bulk Transfer category thereby eliminating LTE usage.

1.6 Adjusting Class-of-Service Demotion Thresholds

This embodiment adjusts the thresholds used by levels 2 and 3 to have percentage of LTE usage be close to desired configurable targets where the defaults are:

65% LTE for Level 2 (that is, 35% of Heavy-Interactive traffic should be Heavy-Interactive Bronze or lower).

35% LTE for Level 3 (that is, 65% of Heavy-Interactive traffic should be Heavy-Interactive Silver or lower).

To help achieve these targets, the Downstream Classifier adjusts a pair of threshold number of bytes (one for each level and thus one each for Heavy-Interactive Bronze and Heavy-Interactive Silver) where an IP flow is demoted when its Adjustment Level is in-effect and when its number of bytes exceeds the threshold.

The downstream classifier maintains an state machine is maintained for each threshold. This state machine has:

the current threshold value in bytes.

the target percentage of undemoted bytes.

The following values provide an estimate of the fraction of undemoted bytes given current and recent threshold values:

Sample size (default 2000 or 50 web pages each with 40 URLs). The state machine adjusts its current threshold value when this number of URLs have been accumulated.

The total number of bytes in the current sample.

The total number of undemoted bytes in the current sample.

Estimated of the percentage of undemoted bytes is 100*the undemoted bytes divided by the total bytes.

The following members define how the current threshold is adjusted:

Step Size (default 1000)—how many bytes the threshold is increased when the estimated percentage is under the target and decreased when the estimated percentage is over the threshold.

Gross Step Size (default 5000)—how many bytes the threshold is increased when the estimated percentage is under the target and decreased when the estimated percentage is over the threshold and when the amount the target is off exceeds Gross Step Threshold Percent.

Gross Step Threshold Percent—when the difference between a sample's demoted percent from the target percent exceeds this value a gross step size is employed to more quickly bring the threshold back into balance.

The downstream classifier only uses a state machine's current threshold value when the ASAP LTE Usage Adjustment setting indicates that the threshold should be applied.

1.7 Adapting the Technology to an Active-Active Implementation

The second implementation is easily adapted to support SD-WAN Routers where, rather than having HTS and LTE WAN transports, the SD-WAN Router 120 has a pair (or more than a pair) of transports where the usage costs are basically equivalent. Such a pair of transports might be, for example, a cable-modem broadband connection together with a lower-speed DSL connection. The result of this adaptation is to have an SD-WAN setup which effectively uses the capacity provided by both WANs so that, even when carrying a single bulk transfer, the capacity of both WANs is effectively utilized.

This is accomplished by having, at a minimum, a Bulk Transfer IP flow packet get its WAN assignment the way the second implementation's Low Latency Required packet gets its assignment, that is, having it take what is expected to be the lowest latency path. Better still is to have all packets get their assignment that same way. The result of this is that the response time sensitive packets are mostly assigned to the lowest latency of the two paths, and the bulk transfer packets share the remaining capacity in a reasonably fair fashion using capacity from both WANs.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices, magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method performed by networking apparatus, the method comprising:
   operating, by the networking apparatus, such that the networking apparatus concurrently maintains connectivity to a network through each of multiple network transports;
   receiving, by the networking apparatus, one or more packets to be transmitted over the network;
   classifying, by the networking apparatus, the one or more packets to determine a class of service for the one or more packets from among a predetermined set of classes of service that includes classes of service that correspond to different latency constraints, wherein classifying the one or more packets comprises determining that a particular received packet is a startup handshake packet for a connection, and in response to the determination, assigning the particular received packet to a highest-priority class of service of the predetermined set of classes of service;
   selecting, by the networking apparatus, one of the multiple network transports to transmit the one or more packets based on (i) the class of service for the one or more packets and (ii) measures of expected latency for transmission of the one or more packets over the respective multiple network transports, wherein the measures of expected latency are based at least in part on amounts of data queued to be transmitted over the respective network transports; and
   transmitting, by the networking apparatus, the one or more packets using the selected network transport.

2. The method of claim 1, wherein determining that the particular received packet is a startup handshake packet for the connection comprises determining that the particular received packet is a synchronize (SYN) packets, a synchronize-acknowledge (SYN-ACK) packet, or an acknowledge (ACK) packet for starting a TCP connection.

3. The method of claim 1, wherein the multiple network transports comprise a first network transport and a second network transport, wherein the first network transport provides lower baseline latency than the first network transport; and
   wherein the networking apparatus is configured to provide startup handshake packets of network connections over the first network transport, and to select for non-startup-handshake packets of the network connections whether to provide the non-startup-handshake packets over the first network transport or second network transport.

4. The method of claim 1, wherein the predetermined set of classes of service comprise a first class of service, a second class of service, and a third class of service, wherein the first class of service is a class of service representing lower latency than the second class of service, and the third class of service represents higher latency than the first class of service and lower latency than the second class of service;
   wherein the networking apparatus is configured to assign startup handshake packets of network connections to the first class of service and to assign non-startup-handshake packets of the network connections to the second class of service.

5. The method of claim 4, wherein a first network transport is selected to provide traffic from the first class of service;
   wherein a second network transport is selected to provide traffic from the second class of service; and wherein the network apparatus varies whether the first network transport or second network transport is provides traffic from the third class of service.

6. The method of claim 1, wherein the network apparatus is configured to identify startup handshake packets of HTTP or HTTPS connections, and is configured to cause the startup handshake packets of the HTTP or HTTPS connections to be transmitted using the network transport, of the multiple network transports, that has the lowest latency.

7. The method of claim 6, wherein the network apparatus is configured to cause initial data-carrying packets of new HTTP or HTTPS connections to be transmitted using the network transport, of the multiple network transports, that has the lowest latency.

8. The method of claim 1, comprising:
determining an amount of data transferred for a network transaction or a rate of data transfer for the network transaction; and
based on the amount of data transferred or the rate of data transfer, adjusting which of the classes in the predetermined set of classes of service is used for at least some packets of the network transaction.

9. The method of claim 1, wherein selecting one of the multiple network transports comprises:
accessing a table indicating a network transport to select for each of the different classes of service, the network transports indicated in the table for at least one of the classes of service being determined based on the measures of expected latency of the different network transports for the at least one of the classes of service; and
selecting the network transport that the table indicates for the class of service determined for the one or more packets.

10. The method of claim 9, further comprising periodically updating the table based on at least one of:
an amount of data in a transmission queue for one of the network transports,
a current throughput of one of the network transports, or
a current transmission latency of one of the network transports.

11. The method of claim 1, further comprising:
calculating a first measure of expected latency for a first network transport of the multiple network transports, wherein the first measure of expected latency is based on a baseline latency for the first network transport, a throughput of the first network transport, and a transmission queue depth for a transmission queue for the first network transport, the measure of expected latency indicating an overall latency between adding a packet to the transmission queue and receipt of the packet over the first network transport; and
calculating a second measure of expected latency for a second network transport of the multiple network transports, wherein the second measure of expected latency is based on a baseline latency for the second network transport, a throughput of the second network transport, and a transmission queue depth for a transmission queue for the second network transport, the measure of expected latency indicating an overall latency between adding a packet to the transmission queue and receipt of the packet over the second network transport.

12. The method of claim 11, wherein selecting one of the multiple network transports comprises:
comparing the first measure of expected latency with the second measure of expected latency; and
based on the comparison, selecting the network transport having the lowest expected latency.

13. The method of claim 1, wherein the one or more packets are part of an IP flow, and
wherein the method includes:
tagging the one or more packets with (i) an IP flow identifier and (ii) sequence numbers that respectively indicate a position of each of the one or more packets in a sequence of packets for the IP flow; and
transmitting each of the one or more packets with the IP flow identifier and its sequence number.

14. The method of claim 1, wherein transmitting the one or more packets using the selected network transport comprises:
tunneling each of the one or more packets using a network tunnel associated with the selected network transport.

15. The method of claim 1, wherein the networking apparatus is a software-defined wide area network (SD-WAN) router or a SD-WAN gateway; and
wherein the network transports include network transports of at least two different access network types from the group consisting of cellular, satellite, digital subscriber line (DSL), coaxial cable, and fiber-optics.

16. A networking apparatus comprising:
one or more processors; and
one or more machine-readable media storing instructions that, when executed by the one or more processors, cause the networking apparatus to perform operations comprising:
operating, by the networking apparatus, such that the networking apparatus concurrently maintains connectivity to a network through each of multiple network transports;
receiving, by the networking apparatus, one or more packets to be transmitted over the network;
classifying, by the networking apparatus, the one or more packets to determine a class of service for the one or more packets from among a predetermined set of classes of service that includes classes of service that correspond to different latency constraints, wherein classifying the one or more packets comprises determining that a particular received packet is a startup handshake packet for a connection, and in response to the determination, assigning the particular received packet to a highest-priority class of service of the predetermined set of classes of service;
selecting, by the networking apparatus, one of the multiple network transports to transmit the one or more packets based on (i) the class of service for the one or more packets and (ii) measures of expected latency for transmission of the one or more packets over the respective multiple network transports, wherein the measures of expected latency are based at least in part on amounts of data queued to be transmitted over the respective network transports; and
transmitting, by the networking apparatus, the one or more packets using the selected network transport.

17. The networking apparatus of claim 16, wherein selecting one of the multiple network transports comprises:
accessing a table indicating a network transport to select for each of the different classes of service, the network transports indicated in the table for at least one of the classes of service being selected based on the measures of expected latency of the different network transports for the at least one of the classes of service; and selecting the network transport that the table indicates for the class of service determined for the one or more packets.

18. The networking apparatus of claim 17, wherein the operations further comprise periodically updating the table based on at least one of:
   an amount of data in a transmission queue for one of the network transports,
   a current throughput of one of the network transports, or
   a current transmission latency of one of the network transports.

19. The networking apparatus of claim 16, further comprising:
   calculating a first measure of expected latency for a first network transport of the multiple network transports, wherein the first measure of expected latency is based on a baseline latency for the first network transport, a throughput of the first network transport, and a transmission queue depth for a transmission queue for the first network transport, the measure of expected latency indicating an overall latency between adding a packet to the transmission queue and receipt of the packet over the first network transport; and
   calculating a second measure of expected latency for a second network transport of the multiple network transports, wherein the second measure of expected latency is based on a baseline latency for the second network transport, a throughput of the second network transport, and a transmission queue depth for a transmission queue for the second network transport, the measure of expected latency indicating an overall latency between adding a packet to the transmission queue and receipt of the packet over the second network transport.

20. One or more non-transitory machine-readable media storing instructions that, when executed by one or more processors of a networking apparatus, cause the networking apparatus to perform operations comprising:
   operating, by the networking apparatus, such that the networking apparatus concurrently maintains connectivity to a network through each of multiple network transports;
   receiving, by the networking apparatus, one or more packets to be transmitted over the network;
   classifying, by the networking apparatus, the one or more packets to determine a class of service for the one or more packets from among a predetermined set of classes of service that includes classes of service that correspond to different latency constraints, wherein classifying the one or more packets comprises determining that a particular received packet is a startup handshake packet for a connection, and in response to the determination, assigning the particular received packet to a highest-priority class of service of the predetermined set of classes of service;
   selecting, by the networking apparatus, one of the multiple network transports to transmit the one or more packets based on (i) the class of service for the one or more packets and (ii) measures of expected latency for transmission of the one or more packets over the respective multiple network transports, wherein the measures of expected latency are based at least in part on amounts of data queued to be transmitted over the respective network transports; and
   transmitting, by the networking apparatus, the one or more packets using the selected network transport.

* * * * *

UNITED STATES PATENT AND TRADEMARK OFFICE
CERTIFICATE OF CORRECTION

| | |
|---|---|
| PATENT NO. | : 11,824,747 B2 |
| APPLICATION NO. | : 17/837553 |
| DATED | : November 21, 2023 |
| INVENTOR(S) | : Douglas Dillon |

It is certified that error appears in the above-identified patent and that said Letters Patent is hereby corrected as shown below:

In the Claims

Column 29, Line 2, In Claim 5, after "second network transport" delete "is".

Signed and Sealed this
Nineteenth Day of March, 2024

*Katherine Kelly Vidal*

Katherine Kelly Vidal
*Director of the United States Patent and Trademark Office*